(12) United States Patent
Bentoski et al.

(10) Patent No.: US 7,963,140 B2
(45) Date of Patent: Jun. 21, 2011

(54) VARIABLE CRIMP ON FLANGE TOOL

(75) Inventors: David M. Bentoski, Flushing, MI (US); Theodore W. Foster, Leslie, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/473,460

(22) Filed: May 28, 2009

(65) Prior Publication Data
US 2010/0300170 A1 Dec. 2, 2010

(51) Int. Cl.
*B21J 7/46* (2006.01)
*B21J 9/18* (2006.01)
*B23P 11/00* (2006.01)

(52) U.S. Cl. ...... 72/211; 72/443; 72/453.03; 72/453.16; 29/243.58

(58) Field of Classification Search ............ 72/211, 72/214, 220, 443, 120, 121, 453.03, 453.16; 29/245, 243.58
See application file for complete search history.

(56) References Cited

U.S. PATENT DOCUMENTS

| 4,037,444 | A | * | 7/1977 | Ledebur et al. | 72/13.4 |
|---|---|---|---|---|---|
| 5,092,151 | A | * | 3/1992 | Catti et al. | 72/389.4 |
| 5,513,938 | A | * | 5/1996 | Chambers | 414/427 |
| 5,875,670 | A | | 3/1999 | Stojkovski et al. | |
| 6,189,360 | B1 | * | 2/2001 | Hatty | 72/308 |
| 7,134,306 | B2 | * | 11/2006 | Muxlow et al. | 72/211 |
| 7,536,889 | B1 | * | 5/2009 | Mueller | 72/101 |
| 2001/0013163 | A1 | | 8/2001 | Menguc | |
| 2004/0255634 | A1 | * | 12/2004 | Muxlow et al. | 72/211 |
| 2005/0247750 | A1 | * | 11/2005 | Burkholder et al. | 227/130 |
| 2006/0016235 | A1 | * | 1/2006 | Rosenau et al. | 72/211 |

FOREIGN PATENT DOCUMENTS

| DE | 69009155 T2 | 10/1994 |
|---|---|---|
| DE | 19709947 A1 | 9/1998 |
| DE | 60100744 T2 | 8/2004 |

OTHER PUBLICATIONS

DE Office Action dated Jan. 13, 2011.

\* cited by examiner

*Primary Examiner* — Dana Ross
*Assistant Examiner* — Mohammad Yusuf
(74) *Attorney, Agent, or Firm* — Quinn Law Group, PLLC

(57) ABSTRACT

A variable crimp on flange (COF) tool is provided for engaging and attaching a weather strip and like structures onto a flange. The COF tool includes a housing with two or more crimp rollers that project therefrom. For example, a fixed roller is mounted to the housing to rotate in a first direction, while a movable roller is mounted to the housing to rotate in a second, opposite direction. The movable roller is axially offset from and movable relative to the fixed roller. A driving mechanism, such as a pneumatic motor, is encased within the housing, and operates to rotate the crimp rollers. A biasing mechanism, such as a pneumatic piston assembly, is also encased within the housing, and operates to move the movable crimp roller relative to the fixed crimp roller. The COF tool is engineered such that the crimp speed, crimp rate, and crimp pressure are independently adjustable.

17 Claims, 10 Drawing Sheets

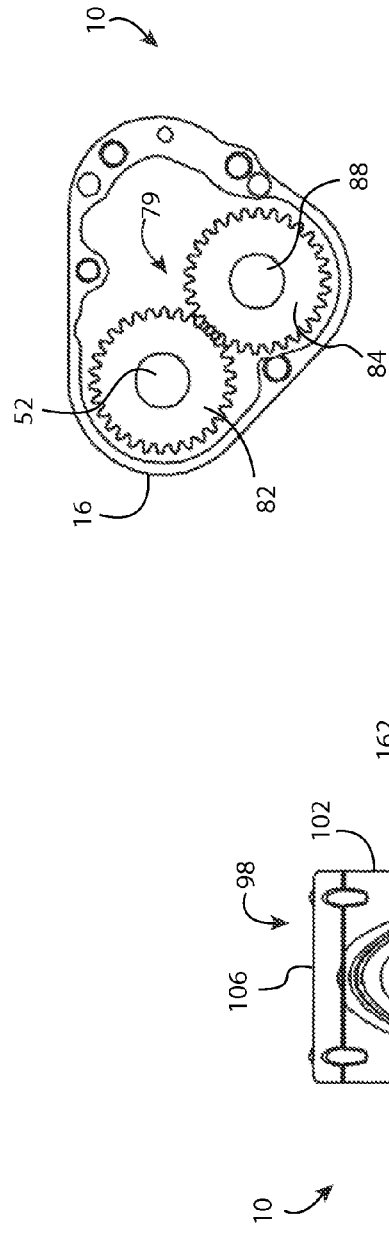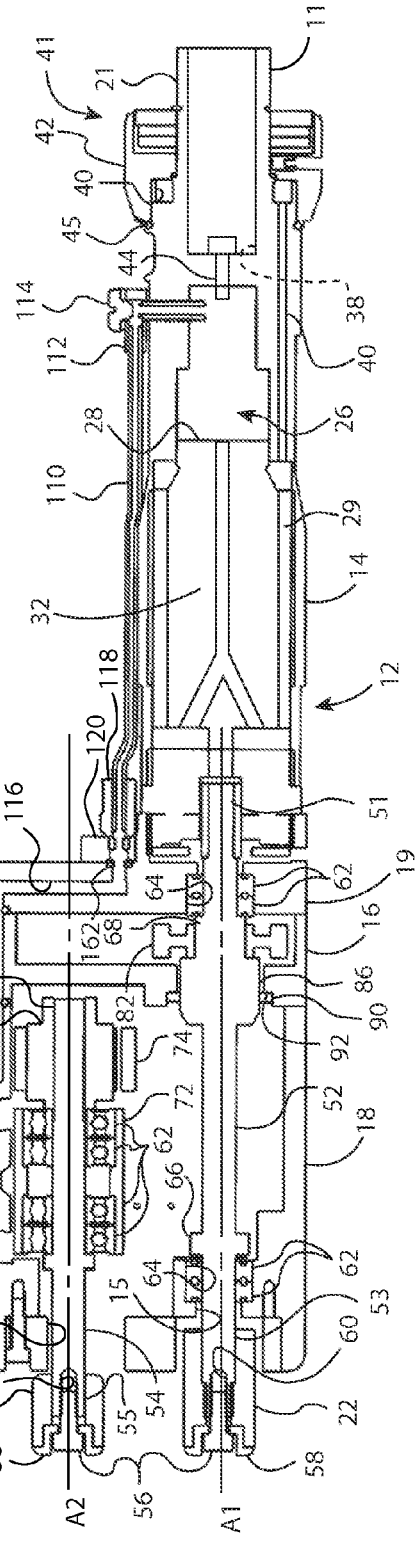
FIG. 4
FIG. 3

VARIABLE CRIMP ON FLANGE TOOL

TECHNICAL FIELD

The present invention relates generally to devices for securing a flange cover onto a flange, and more specifically to mechanized roll forming tools for crimping seals, edge trims, and like structures onto a flange of a motorized vehicle.

BACKGROUND OF THE INVENTION

There are a variety of openings in a vehicle body, such as a trunk opening, an engine compartment opening, and a number of door openings. Many of these openings contain several flange portions that are welded together to join an exterior body panel with an interior panel or reinforcement substructure of the vehicle. These flanges are often exposed when a door assembly or trunk lid is opened, and are therefore commonly covered by an edge trim to conceal the aesthetically unappealing weld joints, or a seal structure (most commonly known as a "weather strip") to prevent the unwanted ingress of rain, wind, dust, and other environmental conditions from the exterior of the vehicle. A secondary purpose of some seal structures is to improve aesthetic appearance, prevent unintentional evacuation of interior air (e.g., heating and air conditioning), and mitigate occupant perceptible exterior noise.

Traditional flange-mounted weather strips have an elastomeric, generally "U-shaped" body with an embedded reinforcing member, such as a metallic carrier, and a flexible sealing segment that projects integrally from one side of the body. The weather strip is presented to the flange with the legs of the U-shaped body in a non-parallel orientation on opposing interior- and exterior-sides of the flange. An inside surface of the seal body typically includes a number of retaining fingers (also referred to as "clamping lips") that project inward from each leg. The seal structure is engaged with the flange by pressing the body against the flange to seat the closed end (or "web") of the U-shaped profile against the terminal end of the flange. The retaining fingers contact the flange, and resist removal.

To engage and retain the seal structure with the flange of the vehicle, a hand-held roll forming tool is often employed to deform the internal reinforcement member. Traditional roll forming tools, which are commonly known as crimp on flange (COF) tools, incorporate a pair of mechanized crimping rollers rotatable in opposite directions about spaced axes, creating an "inward nip". The crimping rollers are generally parallel to one another, and rotate about a stationary axis. An additional guide roller, which is transversely oriented relative to the crimping rollers, may also be incorporated. The various rollers are driven by any of a variety of mechanisms, including pneumatic or electric motors, in conjunction with corresponding gearing between a drive shaft and the rollers.

In use, the COF tool is applied to the flange-gripping portion and, when the rollers are rotating, the rollers drive themselves onto the flange-gripping portion of the seal (e.g., the legs and clamping lips). As the rollers are advanced along the weather strip, they apply a controlled pressure to the profile of the central section. By virtue of the parallel or generally parallel relationship between the rolling surfaces, the rollers will cause the flange-gripping portion of the seal to be crimped into a clamping engagement on the flange. The crimping deforms the internal carrier and, thus, retains the weather strip relative to the flange. The same COF tool can be used to engage and retain edge protectors, bumper inserts, rub rails, and other similarly configured structures.

Prior art COF tools have problems with fitting some flange mounted weather strips because of the manufacturing tolerances for both the weather strip and the vehicle. For instance, the opening to which the weather strip is fitted can have multiple flange thicknesses along its periphery. If the weather strip is preformed to accommodate a specific flange thickness, it may be too wide for single-layer (thin) flange thicknesses, and too narrow for multiple-layer (thick) flange thicknesses. This problem is further complicated because, in recent years, weather strips have developed into complex cross-sections. In addition, the crimp pressure and crimp speed of prior art COF tools cannot be independently adjusted to accommodate varying styles and types of weather strips.

SUMMARY OF THE INVENTION

In accordance with one embodiment of the present invention, a device is presented for engaging and attaching a flange cover to a flange. The device includes a housing with first and second crimp rollers that project outward therefrom. The first crimp roller is operatively attached to the housing to rotate about a first axis, and the second crimp roller is operatively attached to the housing to rotate about a second axis that is axially offset from the first axis. At least one of the first and second crimp rollers is movable relative to the other.

A driving mechanism is operatively engaged with the first and second crimp rollers, and is configured to rotate the first and second crimp rollers at a selectively adjustable crimp speed. A biasing mechanism is operatively engaged with at least one of the first and second crimp rollers, and is configured to move the at least one movable crimp roller relative to the other crimp roller to thereby generate a selectively adjustable crimp pressure between the first and second crimp rollers. The device is engineered such that the crimp speed and crimp pressure are independently selectively adjustable.

According to one aspect of this particular embodiment, the driving mechanism is a pneumatic motor that is disposed, at least partially, within the housing. The pneumatic motor is configured to receive pressurized air, and convert the pressurized air into a rotational force to thereby rotate the first and second crimp rollers. The pneumatic motor preferably includes a control member that is configured to restrict the pneumatic motor, and thereby selectively adjust the crimp speed of first and second crimp rollers. For example, the housing may include an array of exhaust ports that exhaust pressurized air from the pneumatic motor when in an open condition. The control member, in this instance, is a collar that is rotatably attached to the housing. The collar incrementally blocks ones of the array of exhaust ports when it is rotated in a first direction, and incrementally opens respective ones of the array of exhaust ports when rotated in a second direction.

As part of another aspect of this particular embodiment, the device also includes a transmission that drivingly connects the driving mechanism with the first and second crimp rollers to transmit rotational power therebetween. The transmission includes a first crimping shaft coaxial with and positively connected to the first crimp roller, and a second crimping shaft coaxial with and positively connected to the second crimp roller. For instance, the first crimp roller is releasably attached to the first crimping shaft and the second crimp roller is releasably attached to the second crimping shaft such that each of the first and second crimp rollers can be removed from the device, without removing a respective one of the first and second crimping shafts from the device. This feature allows for easy replacement of the various crimp rollers without having to disassemble the entire device, and also enables the use of a variety of rollers for different applications.

In accordance with another facet of this embodiment, the transmission includes a belt drive system that drivingly connects the driving mechanism to at least one of the first and second crimping shafts. In one example, the belt drive system includes a first pulley that is rotatably mounted to the housing and drivingly connected to the driving mechanism. A second pulley is integrated to the second crimping shaft for common rotation therewith. An endless belt drivingly connects the first pulley with the second pulley. The belt drive system reduces operating temperatures, improves durability, and provides smoother, more consistent operation.

In an alternative facet of this particular embodiment, the biasing mechanism includes a pneumatic cylinder disposed, at least partially, within the housing. The pneumatic cylinder is configured to receive and convert pressurized air into a linear force to thereby move the at least one movable crimp roller. The pneumatic cylinder may include a piston that is movably disposed within a pressurizable chamber defined by the housing. The piston is operatively engaged with at least one of the first and second crimp rollers. Pressurizing the pressurizable chamber moves the piston between an undeployed position and a deployed position to thereby move the at least one movable crimp roller. The pneumatic cylinder preferably also includes a flexible diaphragm that is operatively attached to the piston, and configured to prevent the piston from contacting an inner peripheral surface of the pressurizable chamber. The flexible diaphragm reduces friction, improving roller reaction time, improves overall durability, and produces a more consistent crimp force over a variety of flange thicknesses.

In accordance with yet another aspect, the pneumatic cylinder also includes at least one bleed port that is configured to selectively exhaust pressurized air from the pressurizable chamber and thereby selectively adjust the crimp pressure. In addition, or as an alternative thereto, the pneumatic cylinder also includes a flow control valve that is configured to restrict the volume of pressurized air flow to the pressurizable chamber, and thereby selectively adjust the crimp rate at which the at least one movable crimp roller moves relative to the other. As such, the crimp rate, crimp speed, and crimp pressure can each be independently adjusted.

In accordance with one additional aspect, the housing includes a motor adapter housing portion, a gear housing portion, and a main housing portion. The gear housing portion is positioned between the main housing portion and the motor adapter housing portion. A seal member and at least one sealed bearing each fluidly separate the gear housing portion from the main housing portion and the motor adapter housing portion. Such separation prevents inadvertent loss of lubricant which may contaminate the weather strip.

According to another embodiment of the present invention, a crimp on flange (COF) tool is provided for engaging and attaching a weather strip onto a flange. The COF tool includes a fixed crimp roller, a movable crimp roller, and a housing configured to attach to a power source. The fixed crimp roller projects from the housing and is rotatably mounted thereto to rotate about a fixed axis in a first direction. The movable crimp roller projects from the housing and is rotatably mounted thereto to rotate about a movable axis in a second direction opposite the first direction. The movable axis is axially offset from and movable relative to the fixed axis.

A motor and a piston assembly are each encased at least partially within the housing. The motor is drivingly connected to the fixed and movable crimp rollers and is configured to rotate the fixed and movable crimp rollers at a crimp speed. The piston assembly is operatively engaged with the movable crimp roller and is configured to selectively move the movable crimp roller relative to the fixed crimp roller at a crimp rate and generate a crimp pressure between the fixed and movable crimp rollers. The piston assembly includes a piston and a flexible diaphragm. The piston is operatively engaged with the movable crimp roller and movably disposed within a pressurizable chamber defined by the housing. The flexible diaphragm is attached to the piston and the housing and configured to prevent the piston from contacting an inner peripheral surface of the pressurizable chamber. Pressurizing the pressurizable chamber moves the piston between an undeployed position and a deployed position to thereby move the movable crimp roller. The piston assembly further includes at least one bleed port configured to selectively exhaust pressurized air from the pressurizable chamber and thereby selectively adjust the crimp pressure. The piston assembly also includes a flow control valve configured to restrict the volume of pressurized air flow to the pressurizable chamber and thereby selectively adjust the crimp rate. The motor and piston assembly are configured such that the crimp rate, crimp speed, and crimp pressure are independently selectively adjustable.

According to one aspect, the motor is pneumatic and includes a control member configured to restrict a flow of pressurized air exhausted by the motor and thereby selectively adjust the crimp speed of the fixed and movable crimp rollers.

In accordance with an additional aspect, the COF tool includes a transmission drivingly connecting the motor with the fixed and movable crimp rollers to transmit rotational power therebetween. The transmission includes a first crimping shaft coaxial with and positively connected to the fixed crimp roller, a second crimping shaft coaxial with and positively connected to the movable crimp roller, and a belt drive system drivingly connecting the second crimping shaft to the motor via a gear train.

According to another embodiment of the present invention, a COF tool is provided for crimping a weather strip onto a flange of a vehicle opening. The COF tool includes a housing configured to attach at a first end thereof to a pressurized air source. A fixed crimp roller projects from a second end of the housing. The fixed crimp roller is rotatably mounted to the housing to rotate about a fixed axis in a first direction. A movable crimp roller projects from the second end of the housing proximate to the fixed crimp roller. The movable crimp roller is rotatably mounted to the housing to rotate about a movable axis in a second direction opposite the first direction. The movable crimp roller is axially offset from and movable toward and away from the fixed crimp roller.

A pneumatic motor is encased within the housing, and drivingly connected to the movable and fixed crimp rollers. The pneumatic motor is configured to convert pressurized air received from the pressurized air source into a rotational force to thereby rotate the movable and fixed crimp rollers at a crimp speed. The pneumatic motor is configured to selectively adjust the crimp speed.

A pneumatic piston assembly is also encased within the housing, and operatively engaged with the movable crimp roller. The pneumatic piston assembly is configured to convert pressurized air received from the pressurized air source into a linear force to thereby move the movable crimp roller toward the fixed crimp roller at a crimp rate, and thereby generate a crimp pressure between the movable and fixed crimp rollers. The pneumatic piston assembly is configured to selectively adjust the crimp rate and crimp pressure independent of the crimp speed and each other.

The above features and advantages, and other features and advantages of the present invention will be readily apparent from the following detailed description of the preferred embodiments and best modes for carrying out the present invention when taken in connection with the accompanying drawings and appended claims.

BRIEF DESCRIPTION OF THE DRAWINGS

FIG. 3 is a schematic, cross-sectional, plan-view illustration of the device of FIG. 1 taken along line 3-3;

FIG. 4 is a schematic, cross-sectional, end-view illustration of the device of FIG. 1 taken along line 4-4;

DESCRIPTION OF THE PREFERRED EMBODIMENTS

Figure 1:
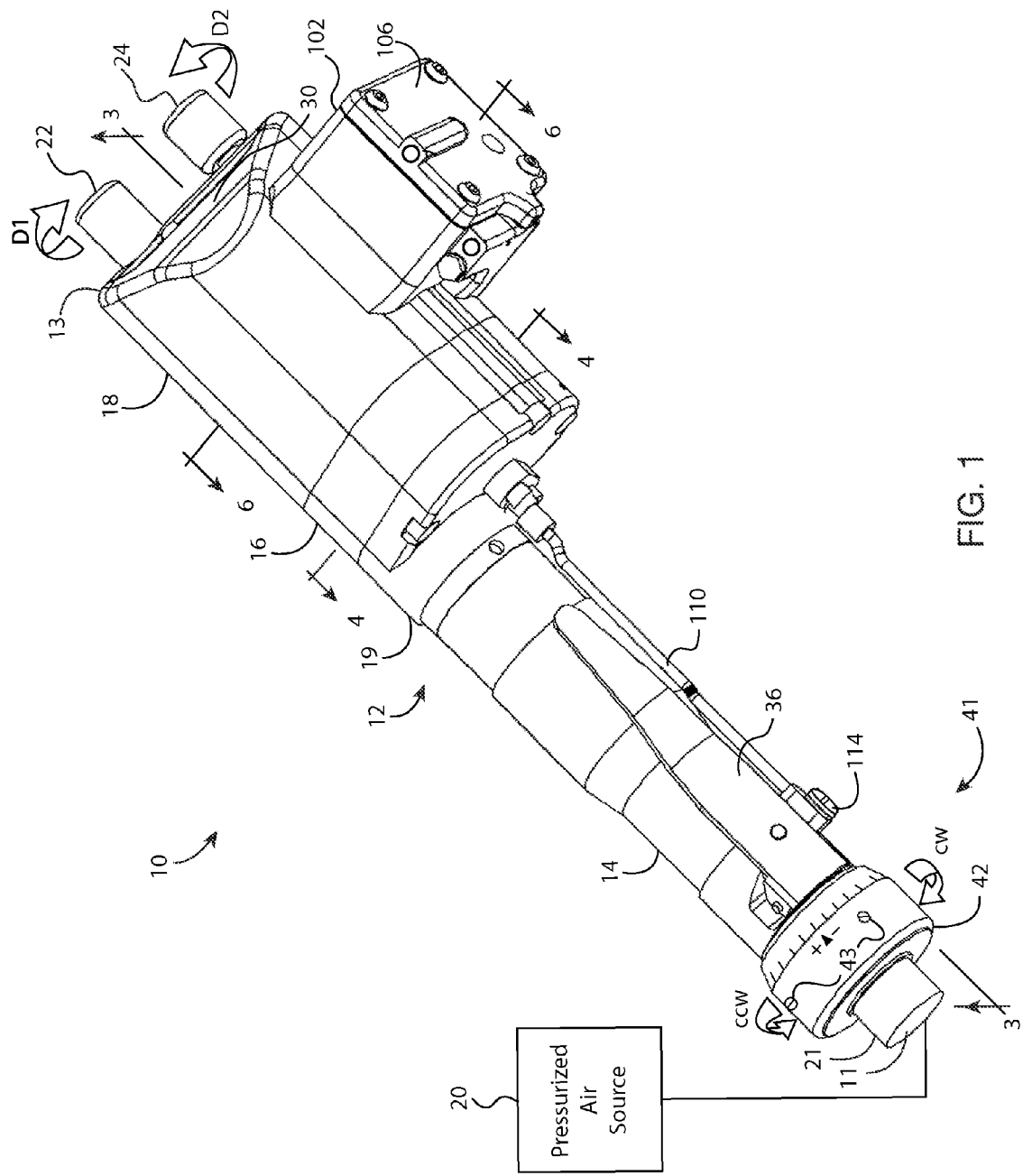
FIG. 1 is a partially-schematic isometric illustration of a device in accordance with the present invention.

Referring to the drawings, wherein like reference numbers refer to like components throughout the several views, FIG. 1 is an isometric illustration of a device, which may be a crimp on flange (COF) tool and is referred to as such herein, identified generally as 10, in accordance with the present invention. The COF tool 10 is described herein for crimping, roll forming, attaching, or otherwise securing a generally U-shaped weather strip (not shown) onto a flange of a vehicle opening (also not shown), which is intended solely as a representative application by which the present invention may be practiced. As such, the present invention is by no means limited to this particular application. For instance, the COF tool 10 can be used to engage and attach other flange covers to a flange, including, but certainly not limited to, edge protectors, flange trims, rub rails, and the like. To that regard, the flange need not be a part of an opening, or even a vehicle for that matter, to practice this particular invention. Finally, the drawings presented herein are not to scale, and are provided purely for instructional purposes. As such, the specific and relative dimensions and orientations shown in the drawings are not to be considered limiting.

The COF tool 10 includes a housing, indicated generally at 12 in FIG. 1, which covers and protects the inner workings of the COF tool 10. The housing 12 is a resilient, elongated structure that consists generally of four primary sections: a motor housing portion 14, a motor adapter housing portion 19, a gear housing portion 16, and a main housing portion 18.

As seen in FIG. 1, the gear housing portion 16 and motor adapter housing portion 19 are positioned between the motor housing portion 14 and the main housing portion 18. More specifically, the gear housing portion 16 is positioned between the main housing portion 18 and the motor adapter housing portion 19. A first end 11 of the housing 12 is configured to attach to a power source 20, such as a remote source of pressurized air (e.g., via air supply hose fitting 21). If size and weight permits, the power source 20 could be attached directly to the housing 12.

Referring to FIG. 1, the COF tool 10 includes a first crimp roller 22 and a second crimp roller 24. The crimp rollers 22, 24 project from the housing 12. More specifically, the first crimp roller 22 and the second crimp roller 24 project outward from an opposing, second end 13 of the housing 12. The crimp rollers 22, 24 are designed to engage a weather strip and, in a generally continuous motion, apply a compressive force to the sides of the weather strip when the crimp rollers 22, 24 are activated and in a closed or closing state, as will be explained in detail hereinbelow. In the embodiment presented in FIG. 1, the COF tool 10 includes two crimp rollers: the first, fixed crimp roller 22 and the second, movable crimp roller 24. That is, at least one of the first and second crimp rollers 22, 24 is movable relative to the other. The fixed crimp roller 22 is operatively attached to the housing 12 to rotate about a first axis A1 (FIG. 3). For example, the fixed crimp roller 22 may be rotatably mounted to the housing 12 to rotate about the first, fixed axis A1 (FIG. 3) in a first direction D1 (FIG. 1). The second crimp roller 24 is also operatively attached to the housing 12 to rotate about a second axis A2 (FIG. 3) axially offset from the first axis A1. For example, the movable crimp roller 24 may be rotatably mounted to the housing 12 to rotate about the second, movable axis A2 (FIG. 3) in a second direction D2 (FIG. 1) opposite the first direction D1, creating an "inward nip".

Figure 2:
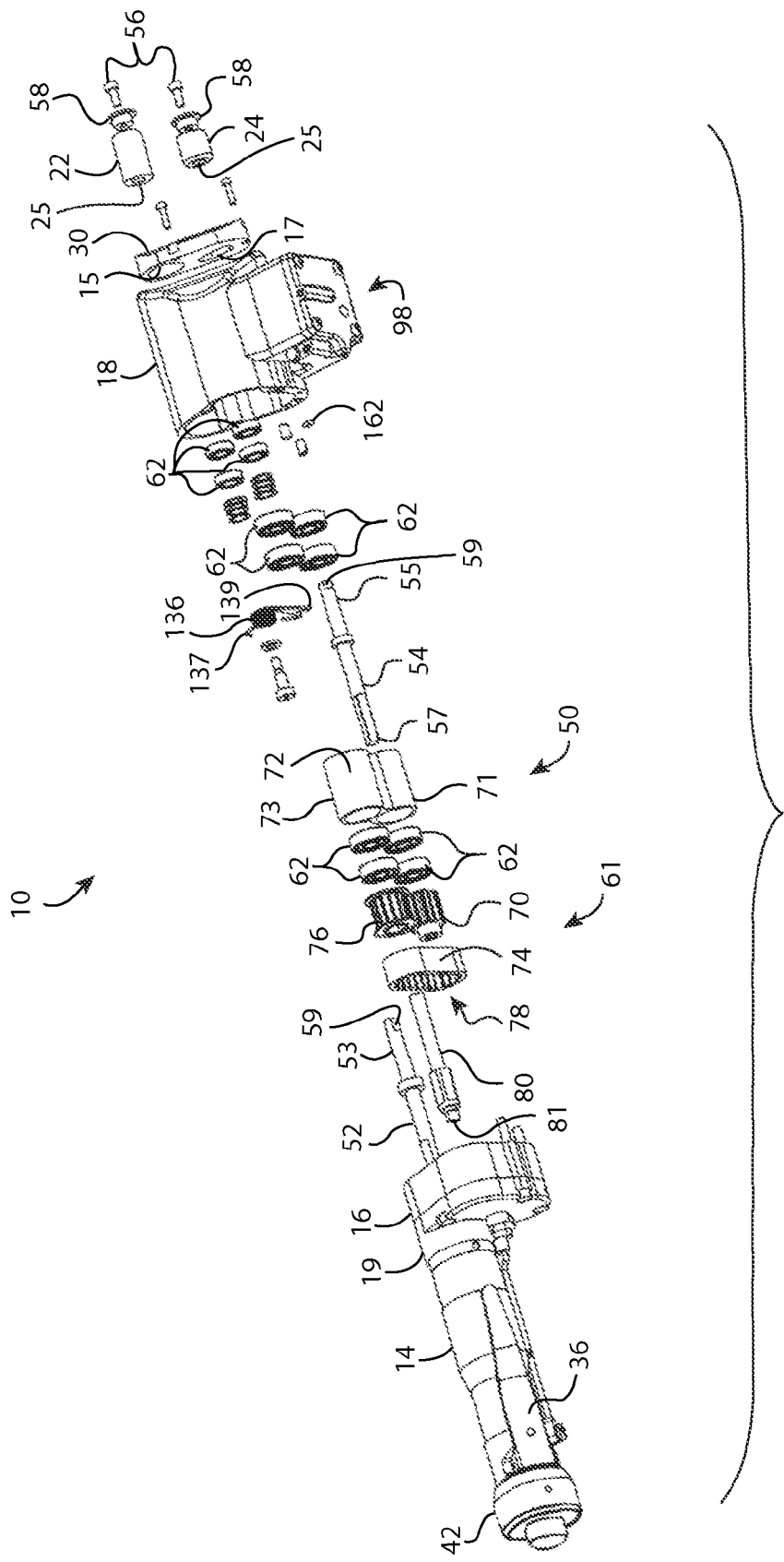
FIG. 2 is an exploded perspective-view illustration of the device of FIG. 1.

The first and second axes A1 and A2 are shown in spaced parallel relation to one another in FIG. 3. The movable crimp roller 24 is axially offset from and movable toward and away from the fixed crimp roller 22. Alternatively, the first crimp roller 22 may be configured to move relative to the second crimp roller 24, or both crimp rollers 22, 24 may be movable. Further, as shown in FIG. 2, each of the first and second crimp rollers 22, 24 may be hollow and generally cylindrically-shaped to define a chamber 25 configured for receiving another element of the COF tool 10, as set forth in more detail below. That is, each of the chambers 25 of the first and second crimp rollers 22, 24 may include a flattened mating surface, e.g., a notch, for receiving a corresponding surface of another element of the COF tool 10. In addition, the COF tool 10 may include more than one set of crimp rollers within the scope of the appended claims. In addition, an optional guide roller (not shown), which is transversely oriented relative to the crimp rollers 22, 24, may also be incorporated into the COF tool 10 without departing from the scope and spirit of the present invention. However, a contoured guide surface 30 (FIGS. 1 and 2) is incorporated into the embodiment shown herein to simplify the overall tool design. The contoured guide surface 30 is a removable piece that can be replaced if wear thereto exceeds an acceptable level.

Referring to both FIGS. 1 and 3, the motor housing portion 14 is an elongated, generally cylindrical, tubular section. The motor housing portion 14 defines an internal chamber, indicated generally at 26 in FIG. 3, which houses a driving mechanism 28 that is configured and adapted to drive and rotate both of the crimp rollers 22, 24 at a selectively adjustable crimp speed. That is, the COF tool 10 includes the driving mechanism 28 (FIG. 3) that is operatively engaged with the first and second crimp rollers 22, 24 and configured to rotate the first and second crimp rollers 22, 24 at a crimp speed. For example, the driving mechanism 28 may include a pneumatic (air) motor 29 disposed at least partially within the housing 12. The pneumatic motor 29 is configured to receive pressurized air, for example, from the pressurized air source 20 seen in FIG. 1, and convert the pressurized air into a rotational force (or rotational power) to thereby rotate the first and second crimp rollers 22, 24. The motor housing portion 14 directs a portion of the flowing pressurized air from the power source 20 into the internal chamber 26 to spin a turbine 32 that is rotatably mounted therein. The turbine 32 has a plurality of circumferentially spaced impeller blades (or "vanes") that project radially outward therefrom.

Referring to FIG. 1, during normal operation of the COF tool 10, an operator positions each of the crimp rollers 22, 24 on opposing sides of the weather strip, and depresses a hand lever 36. Referring to FIG. 3, depressing the hand lever 36 fluidly connects the COF tool 10 to the pressurized air source 20, e.g., via opening a "normally-closed" air valve 44 fluidly coupled to the end fitting 21, allowing pressurized air to be drawn in through inlet conduit 38 (shown hidden in FIG. 3), which is then introduced into the internal chamber 26. As pressure increases in the internal chamber 26 and air flows past the turbine 32 (leftward in FIG. 3), the kinetic energy in the pressurized air urges the impeller blades into a rotational motion, spinning the turbine 32. Recognizably, the driving mechanism 28 can take on other forms, such as an electric motor or other prime mover that can be incorporated to drive the crimp rollers 22, 24. To that regard, the driving mechanism 28 may include more than one motor without departing from the scope of the present invention.

Referring to FIG. 1, the driving mechanism 28 of the COF tool 10 includes a control member 41 configured to restrict the driving mechanism 28 and thereby selectively adjusts, e.g., increases and/or decreases, the crimp speed of the first and second crimp rollers 22, 24. The crimp speed is manipulated by restricting an exhaust air flow of the pneumatic motor 29 (FIG. 3), as set forth in more detail below. In the arrangement presented in FIG. 3, the crimp speed is controlled by varying the back pressure in the exhaust of the pneumatic motor 29. The speed of the pneumatic motor 29, and thus the crimp rollers 22, 24, is determined by the flow rate of the exhaust air through the pneumatic motor 29. If the incoming air flow rate is decreased, the pneumatic motor torque is likewise decreased. If, however, the exhaust air flow rate is restricted and, thus, slowed down, the pneumatic motor speed is reduced with minimal loss of torque. This control member 41 controls the rate of the exhaust air flow.

In one exemplary embodiment, the housing 12 includes an array of exhaust ports (two of which can be seen in FIG. 3 at 40) configured when in an open condition to exhaust pressurized air from the pneumatic motor 29. The exhaust ports 40 may be circumferentially spaced from one another along an outer peripheral edge of the housing 12, at the first end 11 thereof. The exhaust ports 40 are fluidly coupled to the pneumatic motor 29, and exhaust pressurized air therefrom to the atmosphere when in the open condition. The control member 41, in this instance, includes a collar 42 that is rotatably attached to the housing 12. For example, the collar 42 may be annular and rotatably attached to the first end 11 of the housing 12. The collar 42 may be adjacent to the motor housing portion 14, generally overlaying the exhaust ports 40.

The collar 42 is prevented from rotating by three set screws 43 (two of which are visible in FIG. 1). To adjust the crimp speed, the set screws 43 are loosened, the collar 42 pulled away slightly from the housing 12, and adjusted in the appropriate direction. Once the desired speed is set, the collar 42 is pushed firmly back against the housing 12 and o-ring 45 (FIG. 3), and the set screws 43 retightened. In one instance, first and second crimp rollers 22, 24 of the COF tool 10 are factory set to run at from 920 to 940 rotations per minute (rpm) at 60 pounds per square inch (psi) inlet pressure.

The collar 42 is configured to incrementally block respective ones of the array of exhaust ports 40 when rotated in a first direction and, contrastingly, incrementally open, i.e., unblock, respective ones of the array of exhaust ports 40 when rotated in a second direction. For instance, as the collar 42 is rotated in a counterclockwise direction (arrow CCW in FIG. 1), it covers and obstructs the exhaust ports 40 one-by-one, progressively decreasing the exhaust air flow rate from the pneumatic motor 29 and, thereby, decreasing the crimp speed of the crimp rollers 22, 24. Further by way of example, as the collar 42 is rotated in a clockwise direction (arrow CW in FIG. 1), it uncovers and exposes the exhaust ports 40 one-by-one, progressively increasing the air flow rate from the exhaust of pneumatic motor 29 and, thus, increasing the crimp speed of the crimp rollers 22, 24. The number, size, geometry, or orientation of the exhaust ports 40, or any combination thereof, may be varied to provide different rates of speed change, depending upon the particular design requirements of the COF tool 10. To this regard, the control member 41 itself may take on other configurations, such as, but certainly not limited to, a switch, lever, set of buttons, or an electro-mechanical toggle, within the scope of the claimed invention.

The COF tool 10 is intended to be used as a handheld tool, controlled and manipulated by an operator. In this instance, the motor housing portion 14 doubles as a handle for holding the COF tool 10. A section of precut shrink tubing (not explicitly illustrated herein) may be fitted to the outer periphery of the motor housing portion 14, providing a more user-friendly surface for gripping the COF tool 10, and creating an additional layer of protection for the internal components thereof. Alternatively, the COF tool 10 may be integrated into a robotic device or other automated assembly.

Looking then to FIG. 2, the COF tool 10 includes a transmission, collectively indicated by reference numeral 50, that drivingly connects the driving mechanism 28, e.g., the pneumatic motor 29 of FIG. 3, with the first and second crimp rollers 22, 24 to transmit rotational power therebetween. Referring to FIG. 3, the transmission 50 includes a first crimping shaft 52 that is coaxial with and positively connected to the first crimp roller 22 for common rotation therewith. For instance, the first crimp roller 22 is releasably attached to the first crimping shaft 52 via a threaded screw 56. The threaded screw 56 is passed through a hollow, "hat-shaped" nonmetallic roller end 58 that fits into one end of the first crimp roller 22. As the threaded screw 56 is fed through the roller end 58 and the corresponding chamber 25 (FIG. 2) in the first crimp roller 22, the threaded screw 56 threadably mates with a complementary threaded hole 60 (FIG. 3) formed in a longitudinal end 53 of the first crimping shaft 52. The roller end 58 is nonmetallic so that the COF tool 10 does not mar or mark the vehicle opening.

Further, the first crimping shaft 52 may define a flat 59 (FIG. 2) configured to correspond with the mating surface, e.g., notch, of the chamber 25 (FIG. 2) of the first crimp roller 22. That is, the flat 59 may be formed in the longitudinal end 53 of the first crimping shaft 52, and may be configured to mate with the corresponding mating surface, e.g., notch, of the chamber 25 of the first crimp roller 22, thereby minimizing slippage between the first crimping shaft 52 and the first crimp roller 22.

Referring to FIG. 3, the transmission 50 also includes a second crimping shaft 54. The second crimping shaft 54 is coaxial with and positively connected to the second crimp roller 24 for common rotation therewith. Likewise, the second crimp roller 24 is releasably attached to the second crimping shaft 54 by a threaded screw 56, which is passed through the hollow roller end 58, and threadably mated with a complementary threaded hole 60 formed in a longitudinal end 55 of the second crimping shaft 54. In particular, the second crimp roller 24 is releasably attached to the second crimping shaft 54 via a threaded screw 56 that is passed through a hollow, "hat-shaped" roller end 58 that fits into one end of the second crimp roller 24. As the threaded screw 56 is fed through the roller end 58 and the corresponding chamber 25 in the second crimp roller 24, the threaded screw 56 threadably mates with a complementary threaded hole 60 (FIG. 3) formed in a longitudinal end 55 of the second crimping shaft 54.

Further, the second crimping shaft 54 may define a flat 59 (FIG. 2) configured to correspond with the mating surface, e.g., notch, of the chamber 25 (FIG. 2) of the second crimp roller 24. That is, the flat 59 may be formed in the longitudinal end 55 (FIG. 3) of the second crimping shaft 54, and may be configured to mate with the corresponding mating surface, e.g., notch, of the chamber 25 of the second crimp roller 24, thereby minimizing slippage between the second crimping shaft 54 and the second crimp roller 24. By connecting the crimp rollers 22, 24 to their respective crimping shafts 52, 54 in this manner, each of the first and second crimp rollers 22, 24 can be removed from the COF tool 10 without removing a respective one of the first and second crimping shafts 52, 54 from the COF tool 10. That is, each of the first and second crimp rollers 22, 24 can be detached and subsequently replaced without removing either one of the first and second crimping shafts 52, 54 from the housing 12. This feature allows for easy replacement of the various crimp rollers without having to disassemble the entire COF tool 10, and also enables the use of a variety of rollers for different applications.

With reference to both FIGS. 2 and 3, the first crimping shaft 52 is longitudinally oriented within the housing 12, originating in the motor housing portion 14, extending through the gear housing portion 16, motor adapter housing portion 19, and main housing portion 18, and protruding out through a first opening 15 (FIG. 2) in the second end 13 of the housing 12 of the COF tool 10. The first crimping shaft 52 is keyed or otherwise fixed at a first "keyed" end 51 thereof to the turbine 32 for common rotation therewith. The first crimping shaft 52 is also rotatably mounted to the housing 12, for example, via a plurality of roller- or ball-type sealed bearings 62. Referring to FIG. 3, each of these sealed bearings 62 is operatively attached to the housing 12, for example, by being inserted and/or press-fit into a complementary bearing cavity 64 formed in the housing 12. First and second shaft shoulder portions 66 and 68, respectively, abut against opposing end faces of the sealed bearings 62 to thereby retain the first crimping shaft 52 in place relative to the housing 12. When the pneumatic motor 29 is activated, the spinning turbine 32 will transmit rotational power to the first crimping shaft 52 through the first keyed end 51. This rotational power is transmitted through the main housing portion 18 to the fixed crimp roller 22, which is fixed to a second, opposing longitudinal end 53 of the first crimping shaft 52.

Referring to FIG. 3, the second crimping shaft 54 is disposed inside the main housing portion 18, packaged in a generally parallel orientation with respect to the first crimping shaft 52. The longitudinal end 55 of the second crimping shaft 54 protrudes out through a second opening 17 (FIG. 2) in the second end 13 of the housing 12 of the COF tool 10. Referring to FIG. 2, the second crimping shaft 54 extends through a "bone-shaped" pivot block 72. The pivot block 72 is nested inside the main housing portion 18 such that a first cylindrical segment 71 thereof may freely pivot or rotate about a second cylindrical segment 73. Referring to FIG. 3, the second crimping shaft 54 is rotatably mounted to the pivot block 72 via a plurality of sealed bearings 62 that are operatively attached to the pivot block 72, for example, by being inserted and/or press-fit into opposing open ends of the first cylindrical segment 71 (FIG. 2).

In addition to the first and second crimping shafts 52, 54, the transmission 50 also includes a belt drive system 61 (FIG. 2) that drivingly connects the driving mechanism 28 to at least one of the first and second crimping shafts 52, 54. For example, the belt drive system 61 may drivingly connect the pneumatic motor 29 (FIG. 3) to the movable second crimping shaft 54, as set forth in more detail below.

Referring to FIG. 3, the belt drive system 61 may include a first pulley 70 rotatably mounted to the housing 12 and drivingly connected to the driving mechanism 28. In the embodiment presented in FIG. 3, for instance, the second crimping shaft 54 is integral with, keyed on, or otherwise mechanically fixed at a second end 57 thereof to the coaxially oriented, first "unflanged" pulley 70 for common rotation therewith. The first pulley 70 is supported on the second crimping shaft 54 to "float" inside the main housing 18 with the second crimping shaft 54 and second crimp roller 24. That is, the first pulley 70 is configured to spin about its own central axis, and pivot about the axis of the second cylindrical segment 73 (FIG. 2) of the pivot block 72.

The belt drive system 61 presented in FIGS. 2 and 3 also includes a second pulley 76 (FIG. 2) integrated to the second crimping shaft 54 for common rotation therewith. The fixed, second "flanged" pulley 76 is axially offset from the first pulley 70. The second pulley 76 is housed within the main housing portion 18, immediately adjacent to the gear housing portion 16, and attached to or integral with a coaxially oriented pivot shaft 80 (FIG. 2) for common rotation therewith. The pivot shaft 80 is rotatably mounted to the pivot block 72, for example, by a plurality of sealed bearings 62 that are operatively attached to the pivot block 72, for example, by being inserted and/or press-fit into opposing open ends of the second cylindrical segment 73, as best seen in FIGS. 2 and 3. Unlike the first pulley 70, the second pulley 76 does not move or float inside of the main housing portion 18.

With continued reference to both FIGS. 2 and 3, the belt drive system 61 may also include an endless belt 74 drivingly connecting the first pulley 70 with the second pulley 76. The endless belt 74 mechanically links the second pulley 76 (and, thus, pivot shaft 80) with the first pulley 70 (and, thus, second crimping shaft 54) such that rotational power can be transmitted therebetween. In one particular example, the endless belt 74 may be a "timing belt" fabricated to include a number of integrally formed teeth, indicated generally by 78 in FIG. 2, that project inward from an inner surface thereof. The endless belt 74 is wrapped or looped around each of the first and second pulleys 70, 76 such that the belt teeth 78 interleaf with and meshingly engage to pulley teeth (not called out by reference number, but clearly visible in FIG. 2) that are circumferentially oriented along the outer periphery of each of the first and second pulleys 70, 76. In an alternate embodiment, the endless belt 74 and first and second pulleys 70, 76 may be formed without intermeshing teeth, engaging rather by tension and surface friction between the endless belt 74 and first and second pulleys 70, 76. As an additional alternative, the first and second pulleys 70, 76 and endless belt 74 may be respectively replaced with sprockets and a chain (also known as a "chain drive system"). The belt drive system 61 reduces operating temperatures, improves durability and timing, minimizes lubrication needs, and provides smoother, more consistent operation of the COF tool 10.

FIG. 4 is a schematic, cross-sectional illustration of the COF tool 10, taken along line 4-4 in FIG. 1, that provides an alternate view of the gear housing portion 16. This particular view shows the belt drive system 61 (FIG. 2) that is drivingly connected to the driving mechanism 28 (FIG. 3), e.g., the pneumatic motor 29, via a gear train 79 (FIG. 4). More specifically, the belt drive system 61 drivingly connects the second crimping shaft 54 to the pneumatic motor 29 via the gear train 79. In particular, referring to FIG. 4, the gear train 79 includes a first, driving spur gear 82 intermeshed with a second, driven spur gear 84. Referring to FIG. 3, the driving spur gear 82 circumscribes the first crimping shaft 52, trapped inside the gear housing portion 16 between the sealed bearings 62 and a third shaft shoulder portion 86. The driving spur gear 82 is fixedly attached to or integral with the first crimping shaft 52 for common rotation therewith. The driven spur gear 84 (FIG. 4), on the other hand, circumscribes a stub shaft 88 (FIG. 4), which is rotatably mounted to the gear housing portion 16 by a number of bearings, such as the sealed bearings 62 of FIG. 2. For example, the sealed bearings 62 may be sealed roller bearings or sealed ball bearings. The stub shaft 88 passes through an aperture in the gear housing portion 16, and drivingly mates with the pivot shaft 80, for example, by engaging a flank 81 (FIG. 2) which extends longitudinally from a proximate end of the pivot shaft 80. More specifically, as the stub shaft 88 passes through the aperture in the gear housing portion 16, the stub shaft 88 may be supported by two pairs of sealed ball bearings. For example, one pair may be located at each of the opposite ends of the stub shaft 88. That is, a first pair of sealed ball bearings may support and seal the stub shaft 88 in the gear housing portion 16, and a second pair of sealed ball bearings may be mounted in a bearing pocket of the motor adapter housing 19. The bearing pocket may be of any suitable shape. However, in one example, the bearing pocket (not shown) may be similar in shape and/or function to the bearing cavity 64 of the housing 12. Therefore, it is to be appreciated that the two pairs of sealed ball bearings also may support and seal each of the opposite ends of the stub shaft 88. That is, the first pair of sealed ball bearings may support and seal the stub shaft 88 in the gear housing portion 16, and the second pair of seal ball bearings may support and seal the stub shaft 88 in the motor adapter housing 19.

Referring to FIGS. 2, 3 and 4, when the pneumatic motor 29 turns the first crimping shaft 52, as explained hereinabove, torque is transferred therefrom, through the driving spur gear 82 to the driven spur gear 84 through the interplay of the gear cogs. This rotational force is transferred from the driven spur gear 84, through the stub shaft 88, to the pivot shaft 80. The pivot shaft 80, in turn, transfers the torque through the second pulley 76 and endless belt 74 to the first pulley 70, as described above with respect to FIG. 2. Finally, the first pulley 70 operates to turn the second crimping shaft 54 and, thus, rotate the movable crimp roller 24. Although only two nearly identical spur gears are shown in FIG. 4, the gear train 79 can include additional gears and/or gears of varying types, sizes, and teeth counts to alter the speed ratio, mechanical advantage, and general characteristics of the gear train.

The gear train 79, i.e., first, driving and second, driven spur gears, 82 and 84 respectively, are preferably coated with a synthetic grease to reduce friction and heat during activation thereof. A seal member, such as annular shaft seal 90, which is best seen in FIG. 3, is press fit into a seal seat 92 formed in an outer face of the gear housing portion 16, on the opposite side of the gear train 79. The first crimping shaft 52 is coaxially oriented inside the shaft seal 90, and rotates therein. The shaft seal 90 fluidly separates the gear housing portion 16 from the main housing portion 18 and the motor adapter housing portion 19, preventing the inadvertent transfer or leakage of lubricant which may contaminate the seal structure. Also, all of the sealed bearings 62 are configured to minimize lubricant leakage. As such, the shaft seal 90 and at least one sealed bearing 62 each fluidly separate the gear housing portion 16 from the main housing portion 18 and the motor adapter housing portion 19.

Figure 5:
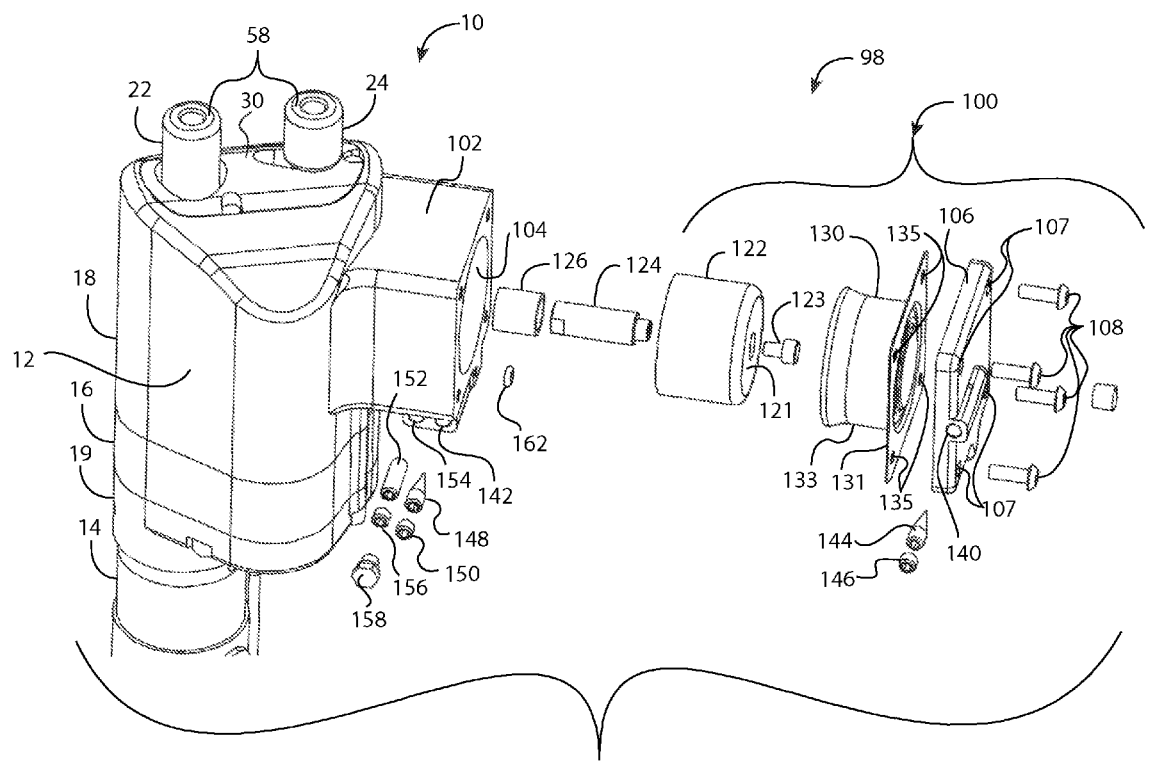
FIG. 5 is an alternate exploded perspective-view illustration of the device of FIG. 1.

Referring to FIG. 5, the COF tool 10 also includes a biasing mechanism 98 operatively engaged with at least one of the first and second crimp rollers 22, 24, and configured to move the at least one movable crimp roller 24 to thereby generate a selectively adjustable crimp pressure between the first and second crimp rollers 22, 24. In the embodiment presented in FIG. 5, the biasing mechanism 98 includes a pneumatic cylinder, indicated generally at 100, disposed at least partially within the housing 12. More specifically, the pneumatic cylinder 100 is packaged inside a cylinder section 102 of the main housing portion 18, which protrudes normally from the remainder of the housing 12 of the COF tool 10, adjacent to the second crimping shaft 54 (not shown) and movable crimp roller 24.

Referring to FIG. 5, the cylinder section 102 defines a cylindrical piston chamber 104 (also referred to herein as "pressurizable chamber"), which is closed off at a distal end thereof by a cylinder cap 106. The cylinder cap 106 is rigidly fixed to the main housing portion 18, for example, by a plurality of cap screws 108. Each cap screw 108 is passed through a respective receiving hole 107 that is formed through a corner of the cylinder cap 106, and threadably engaged with a complimentary hole formed in the cylinder section 102.

The piston chamber 104 is fluidly coupled to a source of pressurized air, such as the pressurized air source 20 of FIG. 1, to receive air therefrom. In one exemplary approach, which is illustrated with reference to FIGS. 1 and 3, a secondary air line 110 is in fluid communication at one end thereof with the motor housing portion 14, namely internal chamber 26, by an air tube adapter block 112 and a banjo screw 114. The banjo screw 114 redirects air entering the motor housing portion 14 through the air supply hose fitting 21 and the air valve 44 to the secondary air line 110. The secondary air line 110 is fluidly coupled at a second end to a fluid conduit 116 by a tube fitting 118 and air tube adapter 120. The fluid conduit 116 originates in the motor adapter housing portion 19, passes through the gear housing portion 16, main housing portion 18, and cylinder cap 106, and terminates at the piston chamber 104, as best seen in FIGS. 3 and 4. This fluid conduit 116 is sealed with o-rings 162 (FIGS. 2 and 3) at each housing face.

Figure 6:
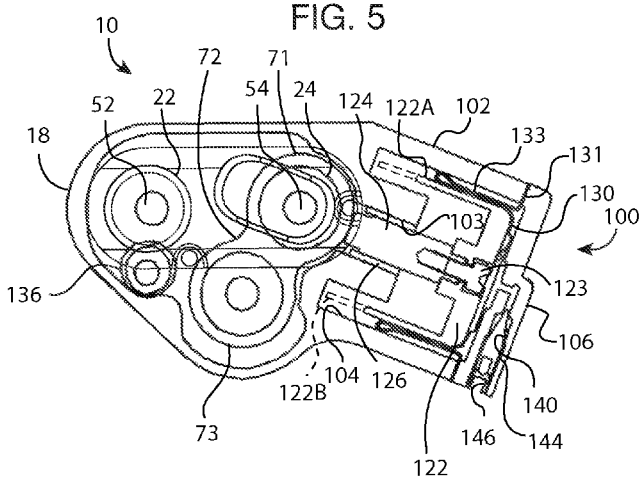
FIG. 6 is a schematic, cross-sectional, end-view illustration of the device of FIG. 1 taken along line 6-6.

Turning back to FIG. 5, the pneumatic cylinder 100 is configured to convert pressurized air into a linear force and thereby move the at least one movable crimp roller 24. That is, the pneumatic cylinder 100 transmits the force to move the movable crimp roller 24 toward the fixed crimp roller 22. As shown in FIG. 5, the pneumatic cylinder 100 includes a piston 122 operatively engaged with at least one of the first and second crimp rollers 22, 24 and movably disposed within the pressurizable chamber 104 defined by the housing 12. As set forth below, pressurizing the pressurizable chamber 104 moves the piston 122 between an undeployed position and a deployed position to thereby move the at least one movable crimp roller 24. The piston 122 is generally cylindrical and hollow, encased within the pressurizable chamber 104, and operable to move transversely with respect to the axis A2 (FIG. 3) of the movable crimp roller 24. For example, the piston 122 is fixed to a concentrically aligned, generally cylindrical piston rod 124 (e.g., via screw 123). As seen in FIGS. 5 and 6, the piston rod 124 is passed through a tubular bushing 126 that is press-fit into a complimentary boss portion 103. The boss portion 103 is formed through the cylinder section 102, providing a passage between the pressurizable chamber 104 and that section of the main housing portion 18 which contains the first and second crimping shafts 52, 54. The bushing 126 functions to slidably retain and properly align the piston rod 124 relative to the housing 12 of the COF tool 10. Referring to FIG. 6, a distal end of the piston rod 124, opposite of the end attached to the piston 122, presses against the first cylindrical segment 71 of the pivot block 72.

Referring to FIGS. 5 and 6, the pneumatic cylinder 100 further includes a flexible "rolling" diaphragm 130 operatively attached to the piston 122. For example, the flexible diaphragm 130 may be attached to the piston 122 by an adhesive disk (not shown) set between an outward projecting face 121 of the piston 122, and an inner surface of the diaphragm 130. The diaphragm 130 is also rigidly secured to the main housing portion 18. The diaphragm 130 has an integral flange portion 131 that protrudes outward from a cup portion 133 thereof. The flange portion 131 includes four holes 135, each positioned at a respective corner. During assembly of the COF tool 10, the flange portion 131 is positioned between the cylinder cap 106 and the cylinder section 102, and aligned such that the cap screws 108 pass through a respective hole 135. In so doing, the diaphragm 130 fluidly seals the piston chamber 104.

The diaphragm 130 is configured to prevent the piston 122 from contacting an inner peripheral surface of the pressurizable chamber 104. As seen in FIG. 6, the diaphragm cup portion 133 covers and generally circumscribes the piston 122. The diaphragm 130 is positioned such that the cup portion 133 is, to a certain degree, always between the piston 122 and the inner peripheral surface of the piston chamber 104. That is, the diaphragm 130 "rolls" and "unrolls" as necessary. The flexible diaphragm 130 reduces or eliminates all sliding friction between the piston 122 and chamber 104, improving roller reaction time. This also improves overall durability, and produces a more consistent crimp force over a variety of flange thicknesses.

Referring to FIG. 6, increasing the pressure inside of the pressurizable chamber 104 moves the piston 122 between the undeployed position, shown at 122A in FIG. 6, and the deployed position, shown hidden in FIG. 6 at 122B, to thereby move the movable crimp roller 24. As air is fed into the chamber 104 via secondary air line 110 (FIG. 3) and fluid conduit 116 (FIG. 3), pressure builds up between the diaphragm 130 and the cylinder cap 106. When the pressure reaches a threshold value, the piston 122 is urged or forced in a direction toward the second crimping shaft 54 of the movable crimp roller 24. The piston rod 124 is moved contemporaneously with the piston 122 until it presses against the first cylindrical segment 71 of the pivot block 72. This, in turn, forces the second crimp roller 24 toward the first crimp roller 22, creating a crimp force therebetween. In one embodiment, the movable crimp roller 24 is designed with up to 10 mm of roller stroke (although other values are envisioned).

A second biasing mechanism 136 operates to urge the first and second crimp rollers 22, 24 away from each other to an open position, as shown in FIG. 6. In the preferred embodiment shown, this is accomplished by a torsion spring. A first end 137 of the torsion spring 136 (seen in FIG. 2) presses against an inside surface of the main housing portion 18 (as seen in FIG. 6), whereas a second, opposing end 139 (FIG. 2) presses against the first cylindrical segment 71 of the pivot block 72 (as seen with reference to FIGS. 2 and 6). Other devices may be employed in lieu of a torsion spring for the second biasing mechanism 136. By way of example, and not limitation, a compression spring, a tension spring, or any other biasing device which applies a generally constant force through substantially the full range of motion of the movable crimp roller 24 may be employed.

The COF tool 10 is engineered such that the crimp rate (i.e., the rate at which the movable crimp roller 24 translates toward the fixed crimp roller 22) and crimp pressure (i.e., the force generated by the crimp rollers 22, 24 when in a closed or closing position) can be adjusted independent of each other, and independent of the crimp speed at which the crimp rollers 22, 24 rotate. This may be accomplished by incorporating a number of bleed valves into the pneumatic cylinder 100.

With continued reference to FIG. 5, the pneumatic cylinder 100 further includes at least one bleed port 140 configured to selectively exhaust pressurized air from the pressurizable chamber 104 and thereby selectively adjust the crimp pressure. As seen in FIG. 6, for example, a first bleed port 140 is in fluid communication with the piston chamber 104. A tapered screw 144 is threaded into the first bleed port 140, and locked into place by a set screw 146, sealing off the first bleed port 140. The tapered screw 144 may be turned and adjusted away from the housing 12 to progressively open the first bleed port 140, allowing selective amounts of air to evacuate from the pressurizable chamber 104. Conversely, adjusting the tapered screw 144 toward the housing 12 will progressively close or seal the first bleed port 140, disallowing the evacuation of air from the pressurizable chamber 104. As seen in FIG. 5, a second bleed port 142 is similarly configured, with a tapered screw 148 and set screw 150. Notably, the set screws 146 and 150 must be removed before the tapered screws 144 and 148 can be adjusted. The size of the first and second bleed ports 140, 142 can be varied, independently or collectively, to provide different fluid-evacuating characteristics. Likewise, the first and second bleed ports 140, 142 may be substituted with a single bleed port or, alternatively, numerous bleed ports without departing from the scope and spirit of this invention.

Referring to FIG. 5, the pneumatic cylinder 100 also includes a flow control valve 152 configured to restrict the volume of pressurized airflow to the pressurizable chamber 104, and thereby selectively adjust the crimp rate at which the at least one movable crimp roller 24 moves relative to the fixed crimp roller 22. The flow control valve 152 is represented herein by an elongated set screw that fits into a flow port 154, and retained therein by set screw 156 and pipe plug 158. The set screw 156 can be translated inward and outward with respect to the flow port 154 to variably block the fluid conduit 116 (FIG. 3). In other words, the set screw 156 can be adjusted in a first direction to increasingly block or obstruct the fluid conduit 116, reducing the volume of air passing to the pressurizable chamber 104. Conversely, adjusting the set screw 156 in a second, opposite direction will progressively unblock or open the fluid conduit 116, increasing the volume of air passing to the pressurizable chamber 104.

Figure 7:
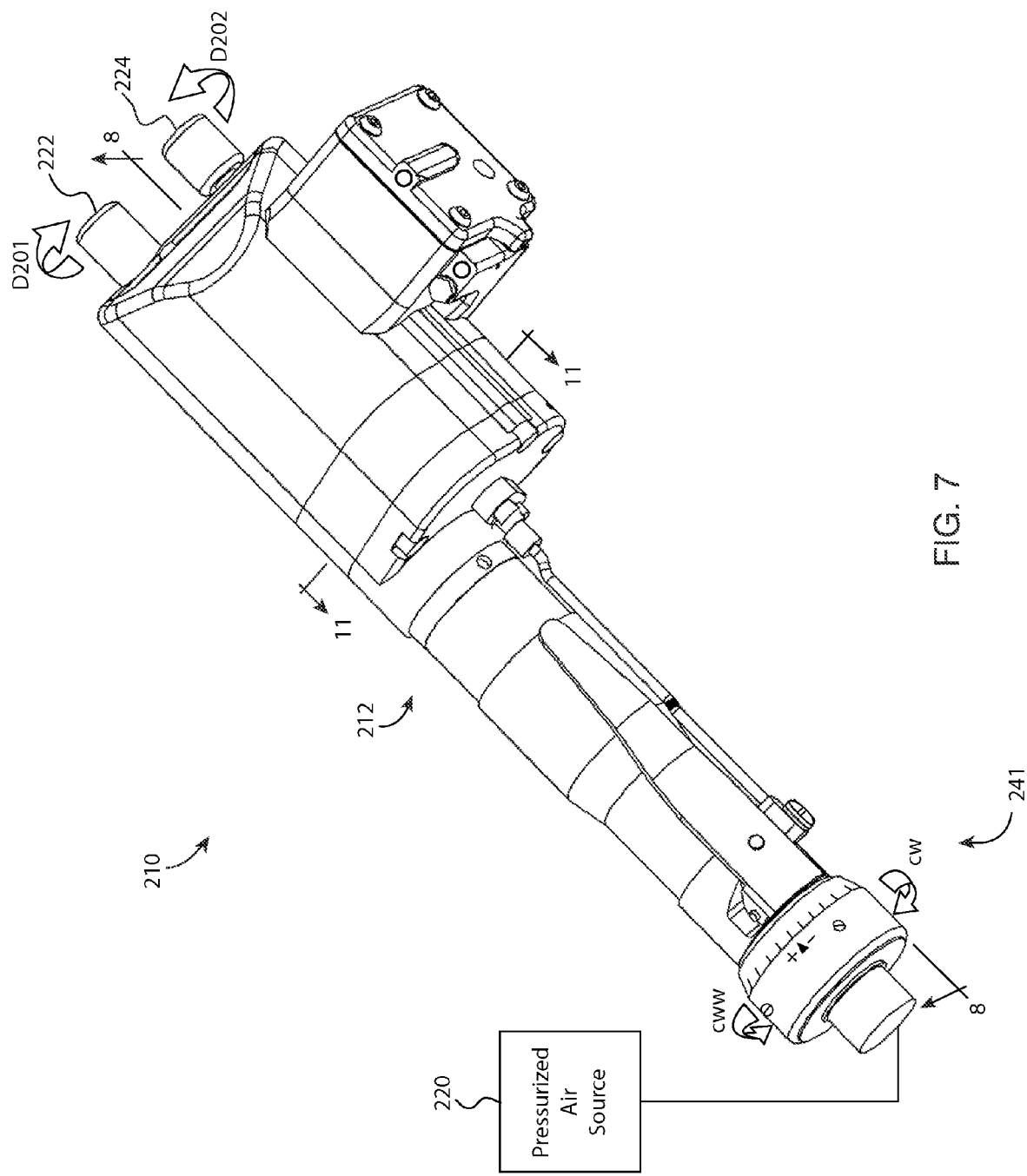
FIG. 7 is a partially-schematic isometric illustration of a crimp on flange (COF) tool in accordance with the present invention.
Figure 8:
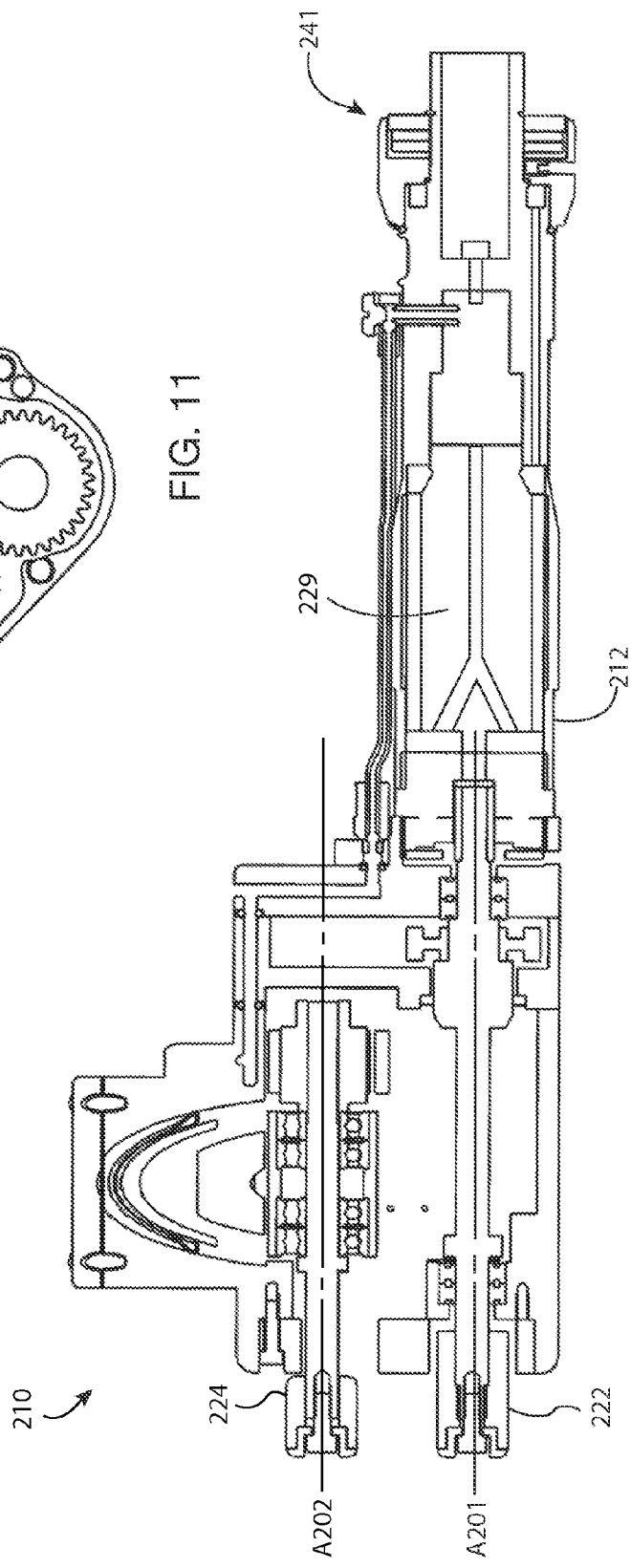
FIG. 8 is a schematic, cross-sectional, plan-view illustration of the COF tool of FIG. 7 taken along line 8-8.

Referring to FIGS. 7 and 8, in another embodiment, a COF tool 210 for engaging and attaching a weather strip onto a flange includes a housing 212 configured to attach to a power source 220. The COF tool 210 also includes a fixed crimp roller 222 projecting from the housing 212 and rotatably mounted thereto to rotate about a fixed axis A201 (FIG. 8) in a first direction D201 (FIG. 7). Further, the COF tool 210 includes a movable crimp roller 224 projecting from the housing 212 and rotatably mounted thereto to rotate about a movable axis A202 (FIG. 8) in a second direction D202 (FIG. 7) opposite the first direction D201. The movable axis A202 is axially offset from and movable relative to the fixed axis A201, as shown in FIG. 8.

Referring to FIG. 8, the COF tool 210 includes a motor 229 encased at least partially within the housing 212 and drivingly connected to the fixed and movable crimp rollers 222, 224. The motor 229 is configured to rotate the fixed and movable crimp rollers 222, 224 at a crimp speed. The motor 229 may be pneumatic and may include a control member 241 configured to restrict a flow of pressurized air exhausted by the motor 229 and thereby selectively adjust the crimp speed of the fixed and movable crimp rollers 222, 224.

Figure 9:
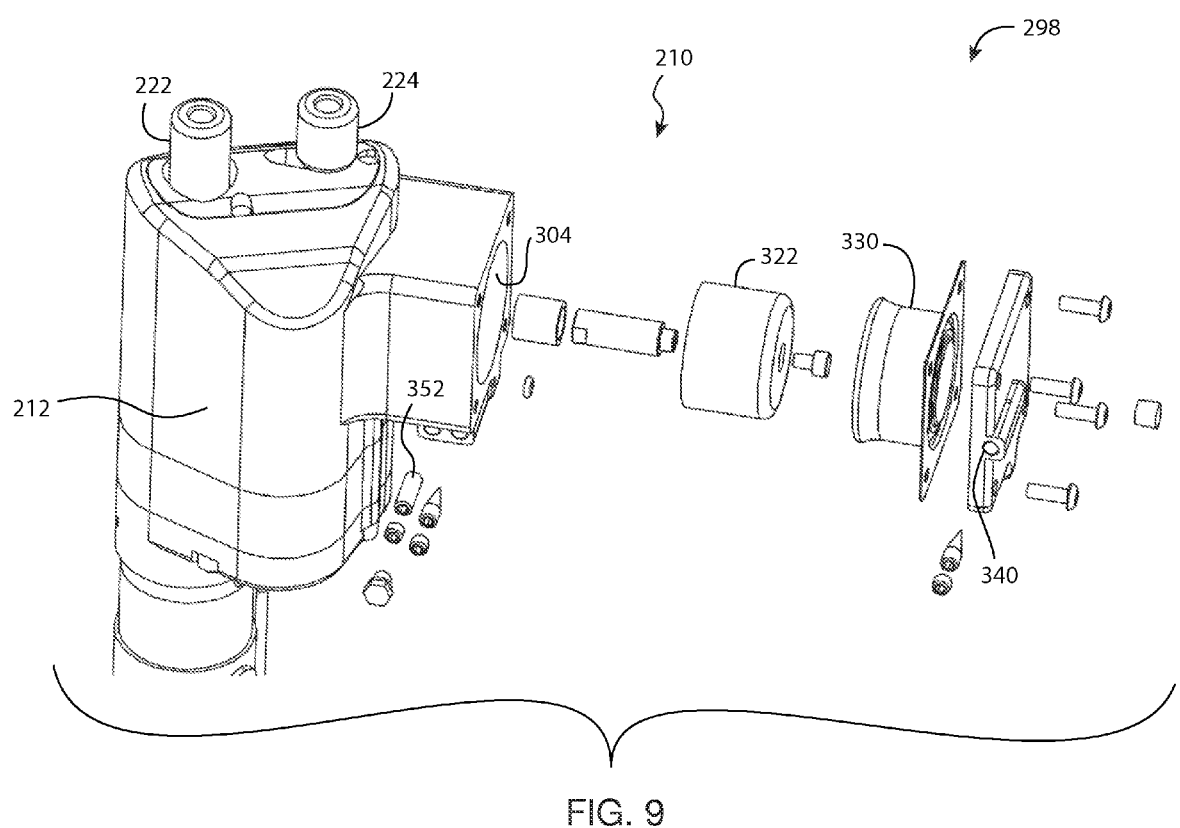
FIG. 9 is an alternate exploded perspective-view illustration of the COF tool of FIG. 7.

Referring to FIG. 9, the COF tool 210 also includes a piston assembly 298 encased at least partially within the housing 212 and operatively engaged with the movable crimp roller 224. The piston assembly 298 is configured to selectively move the movable crimp roller 224 relative to the fixed crimp roller 222 at a crimp rate and generate a crimp pressure between the fixed and movable crimp rollers 222, 224. The motor 229 and the piston assembly 298 are configured such that the crimp rate, crimp speed, and crimp pressure are independently selectively adjustable.

The piston assembly 298 may include a piston 322 operatively engaged with the movable crimp roller 224 and movably disposed within a pressurizable chamber 304 defined by the housing 212. The piston assembly 298 may also include a flexible diaphragm 330 attached to the piston 322 and the housing 212 and configured to prevent the piston 322 from contacting an inner peripheral surface of the pressurizable chamber 304. Pressurizing the pressurizable chamber 304 moves the piston 322 between an undeployed position and a deployed position to thereby move the movable crimp roller 224.

Referring to FIG. 9, the piston assembly 298 may further include at least one bleed port 340 configured to selectively exhaust pressurized air from the pressurizable chamber 304 and thereby selectively adjust the crimp pressure. The piston assembly 298 may also include a flow control valve 352 configured to restrict the volume of pressurized air flow to the pressurizable chamber 304 and thereby selectively adjust the crimp rate.

Figure 11:
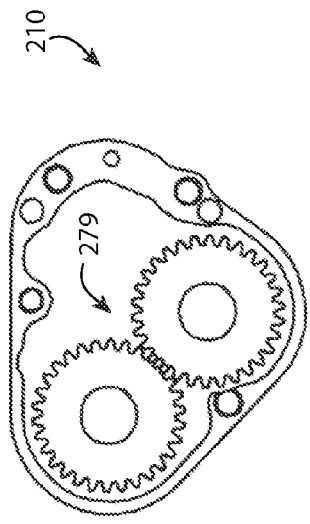
FIG. 11 is a schematic, cross-sectional, end-view illustration of the COF tool of FIG. 7 taken along line 11-11.
Figure 10:
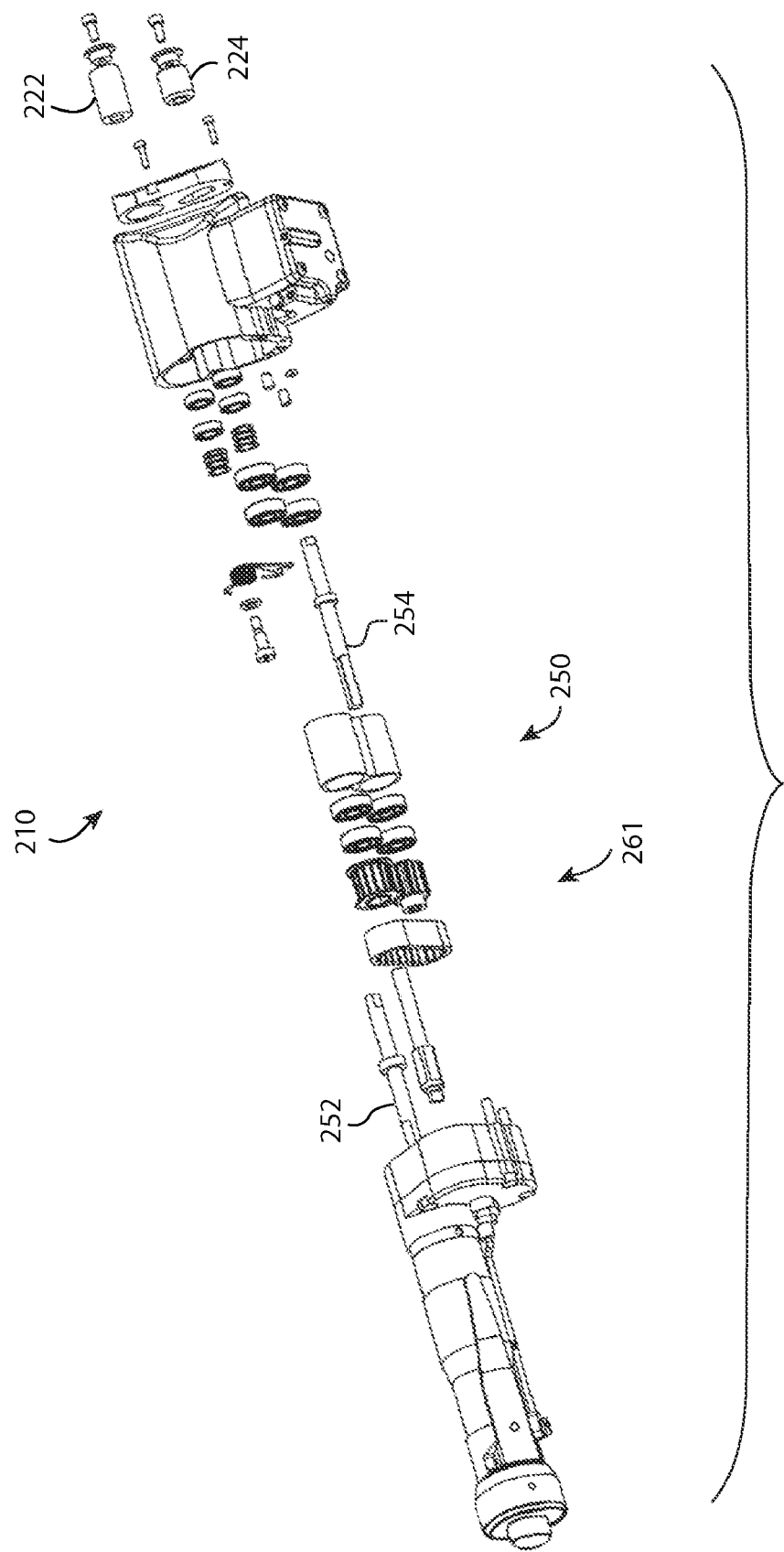
FIG. 10 is an exploded perspective-view illustration of the COF tool of FIG. 7.

Referring to FIG. 10, the COF tool 210 further includes a transmission 250 drivingly connecting the motor 229 (FIG. 8) with the fixed and movable crimp rollers 222, 224 to transmit rotational power therebetween. The transmission 250 includes a first crimping shaft 252 coaxial with and positively connected to the fixed crimp roller 222, and a second crimping shaft 254 coaxial with and positively connected to the movable crimp roller 224. Referring to FIGS. 10 and 11, the transmission 250 also includes a belt drive system 261 drivingly connecting the second crimping shaft 254 to the motor 229 (FIG. 8) via a gear train 279 (FIG. 11).

Figure 12:
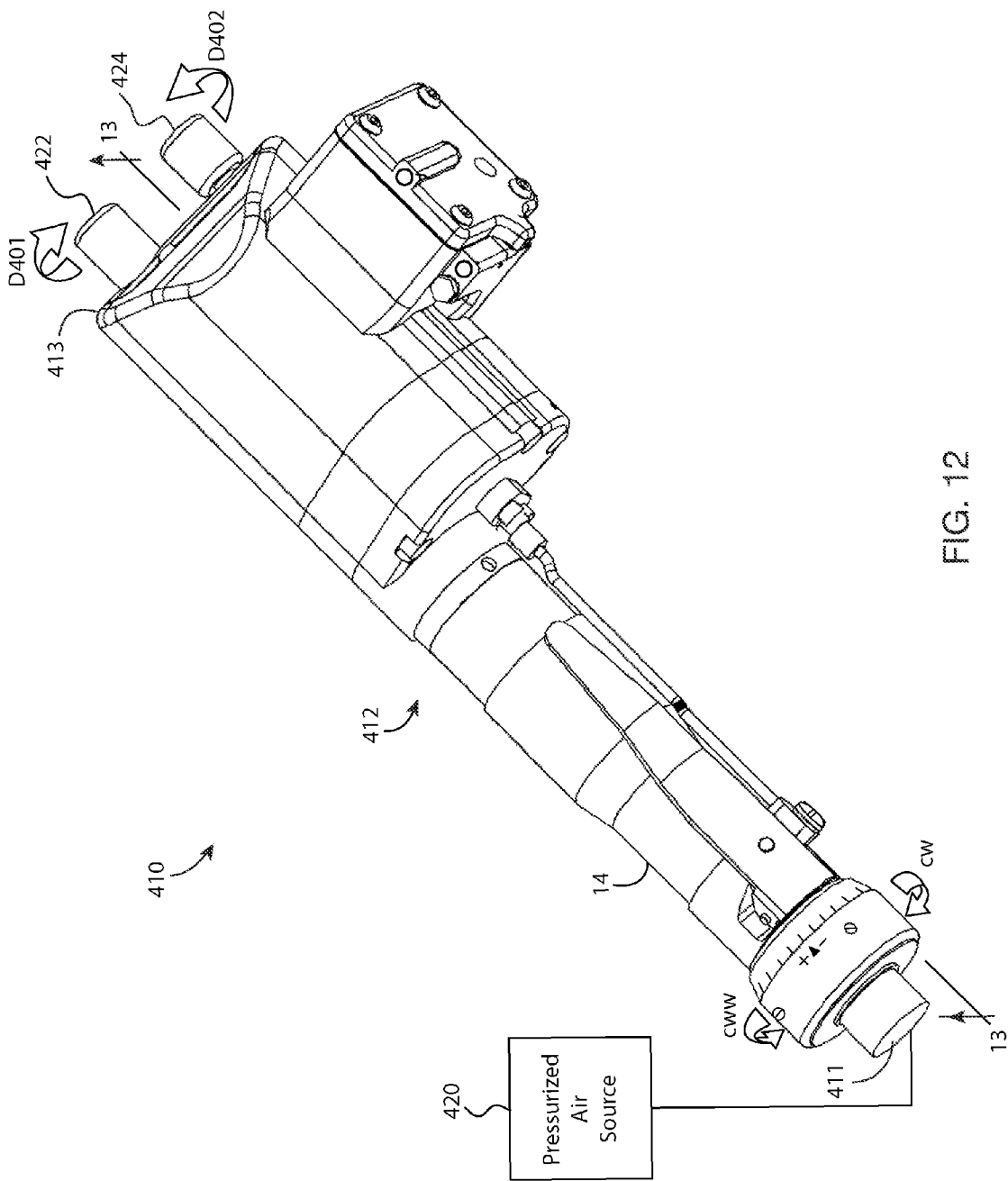
FIG. 12 is a partially-schematic isometric illustration of another embodiment of the COF tool.

Referring to FIG. 12, in another embodiment, a COF tool 410 for crimping a weather strip onto a flange of a vehicle opening includes a housing 412 configured to attach at a first end 411 thereof to a pressurized air source 420. The COF tool 410 also includes a fixed crimp roller 422 projecting from a second end 413 of the housing 412 and rotatably mounted to the housing 412 to rotate about a fixed axis A401 (FIG. 13) in a first direction D401 (FIG. 12). The COF tool 410 also includes a movable crimp roller 424 projecting from the second end 413 of the housing 412 proximate to the fixed crimp roller 422 and rotatably mounted to the housing 412 to rotate about a movable axis A402 (FIG. 13) in a second direction D402 (FIG. 12) opposite the first direction D401. The movable crimp roller 424 is axially offset from and moveable toward and away from the fixed crimp roller 422.

Figure 13:
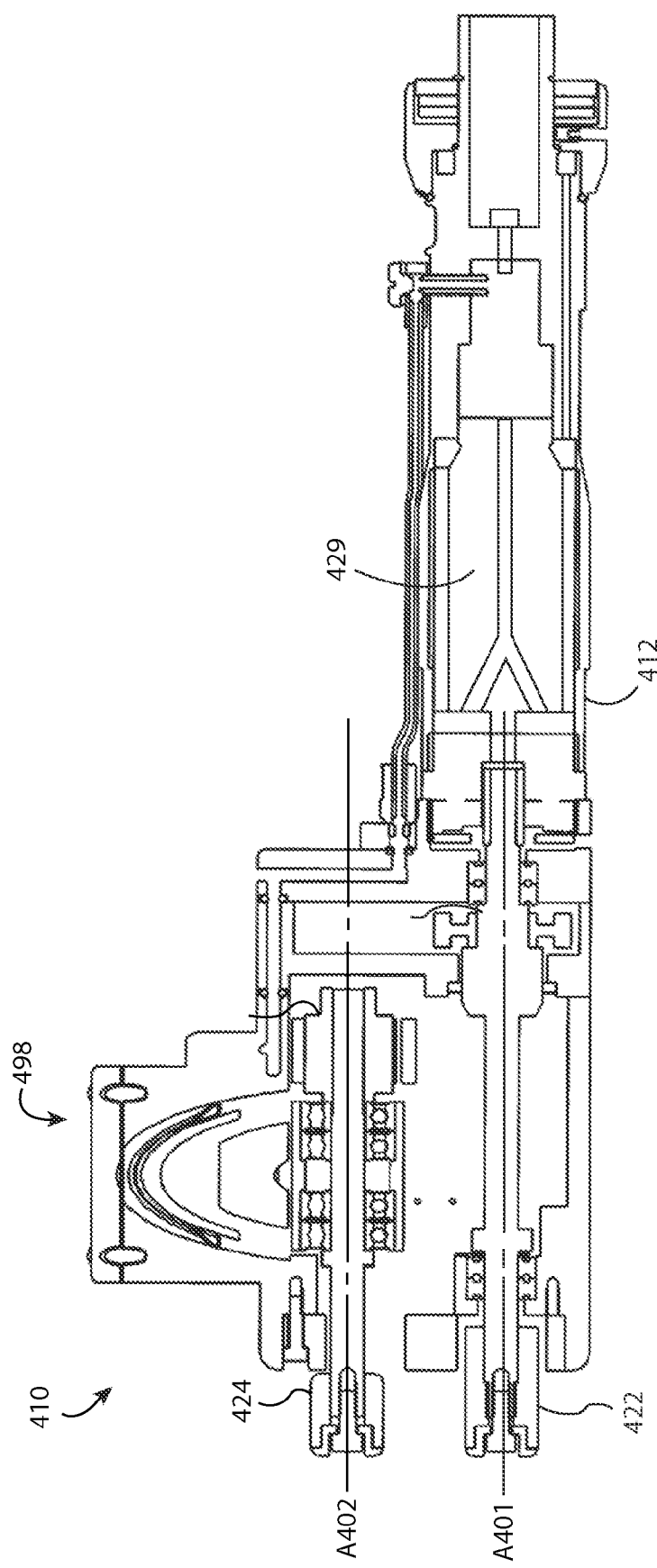
FIG. 13 is a schematic, cross-sectional, plan-view illustration of the device of FIG. 12 taken along line 13-13.

Referring to FIG. 13, the COF tool 410 also includes a pneumatic motor 429 encased within the housing 412 and drivingly connected to the fixed and movable crimp rollers 422, 424. The pneumatic motor 429 is configured to convert pressurized air received from the pressurized air source 420 into a rotational force to thereby rotate the fixed and moveable crimp rollers 422, 424 at a crimp speed.

Referring to FIG. 13, the COF tool 410 also includes a pneumatic piston assembly 498 encased within the housing 412 and operatively engaged with the moveable crimp roller 424. The pneumatic piston assembly 498 is configured to convert pressurized air received from the pressurized air source 420 into a linear force to thereby move the moveable crimp roller 424 toward the fixed crimp roller 422 at a crimp rate and thereby generate a crimp pressure between the fixed and movable crimp rollers 422, 424. The pneumatic motor 429 is configured to selectively adjust the crimp speed and the pneumatic piston assembly 498 is configured to selectively adjust the crimp rate and crimp pressure independent of the crimp speed and each other.

The present invention provides a common COF tool 10, 210, 410 that can be used across a variety of vehicle platforms with minor or no modifications. Unlike any COF tool that is currently available, this design has the ability to have independent adjustment of crimp force, crimp speed, and crimp rate. In addition, the quick change crimp rollers 22, 24, 222, 224, 422, 424 reduce changeover time and servicing costs. The design of the COF tool 10, 210, 410 presented herein is compact and light weight, and generates a consistent crimp force, independent of the weather strip flange thickness, over the operating range of the COF tools 10, 210, 410 (e.g., ±3%).

While the best modes for carrying out the invention have been described in detail, those familiar with the art to which this invention relates will recognize various alternative designs and embodiments for practicing the invention within the scope of the appended claims.

The invention claimed is:

1. A handheld crimp on flange (COF) tool for crimping a weather strip onto a flange of a vehicle opening, the handheld COF tool comprising:

a housing configured as a handle for use in holding the handheld COF tool, wherein said housing attaches at a first end thereof to a pressurized air source;

a fixed crimp roller projecting from a second end of said housing, and rotatably mounted to said housing to rotate about a fixed axis in a first direction;

a movable crimp roller projecting from said second end of said housing proximate to said fixed crimp roller and rotatably mounted to said housing to rotate about a movable axis in a second direction opposite said first direction, wherein said movable crimp roller is axially offset from and movable toward and away from said fixed crimp roller;

a pneumatic motor encased within said housing and drivingly connected to said movable crimp roller and said fixed crimp roller, wherein said pneumatic motor is configured to convert pressurized air received from said pressurized air source into a rotational force to thereby rotate said movable crimp roller and said fixed crimp roller at a crimp speed;

a pneumatic piston assembly encased within said housing and operatively engaged with said movable crimp roller, wherein said pneumatic piston assembly is configured to convert pressurized air received from said pressurized air source into a linear force to thereby move said movable crimp roller toward said fixed crimp roller at a crimp rate and thereby generate a crimp pressure between said movable crimp roller and said fixed crimp roller; and
a hand lever disposed on said housing and operative to fluidly connect said pneumatic motor, said pressurized air source, and said pneumatic piston assembly;
wherein said pneumatic motor is configured to selectively adjust said crimp speed, and said pneumatic piston assembly is configured to selectively adjust said crimp rate and said crimp pressure independent of said crimp speed and each other.

2. The handheld COF tool of claim 1, wherein said pneumatic motor further includes a control member configured to restrict said pneumatic motor and thereby selectively adjust said crimp speed of said fixed crimp roller and said movable crimp roller.

3. The handheld COF tool of claim 2, wherein said housing defines an array of exhaust ports configured when in an open condition to exhaust pressurized air from said pneumatic motor, and wherein said control member includes a collar rotatably attached to said housing and configured to incrementally block respective ones of said array of exhaust ports when rotated in a first direction, and incrementally open respective ones of said array of exhaust ports when rotated in a second direction.

4. The handheld COF tool of claim 1, further comprising:
a transmission drivingly connecting said pneumatic motor with said fixed crimp roller and said movable crimp roller to transmit rotational power between said pneumatic motor and at least one of said fixed crimp roller and said movable crimp roller, said transmission including a first crimping shaft coaxial with and positively connected to said fixed crimp roller, and a second crimping shaft coaxial with and positively connected to said movable crimp roller.

5. The handheld COF tool of claim 4, wherein said transmission includes a belt drive system drivingly connecting at least one of said first crimping shaft and said second crimping shaft to said pneumatic motor.

6. The handheld COF tool of claim 5, wherein said belt drive system includes a first pulley rotatably mounted to said housing and drivingly connected to said pneumatic motor, a second pulley integrated to said second crimping shaft for common rotation therewith, and an endless belt drivingly connecting said first pulley with said second pulley.

7. The handheld COF tool of claim 1, wherein said pneumatic piston assembly includes a pneumatic cylinder disposed at least partially within said housing, and configured to receive and convert pressurized air into a linear force to thereby move said movable crimp roller.

8. The handheld COF tool of claim 7, wherein said pneumatic cylinder includes a piston operatively engaged with said at least one of said fixed crimp roller and said movable crimp roller and movably disposed within a pressurizable chamber defined by said housing, wherein pressurizing said pressurizable chamber moves said piston between an undeployed position and a deployed position to thereby move said movable crimp roller.

9. The handheld COF tool of claim 8, wherein said pneumatic cylinder further includes a flexible diaphragm operatively attached to said piston and configured to prevent said piston from contacting an inner peripheral surface of said pressurizable chamber.

10. The handheld COF tool of claim 8, wherein said pneumatic cylinder further includes at least one bleed port configured to selectively exhaust pressurized air from said pressurizable chamber and thereby selectively adjust said crimp pressure.

11. The handheld COF tool of claim 8, wherein said pneumatic cylinder further includes a flow control valve configured to restrict the volume of pressurized air flow to said pressurizable chamber and thereby selectively adjust a crimp rate at which said movable crimp roller moves relative to said fixed crimp roller.

12. The handheld COF tool device of claim 1, wherein said housing includes a gear housing portion positioned between a main housing portion and a motor adapter housing portion, wherein a seal member and at least one sealed bearing each fluidly separate said gear housing portion from said main housing portion and said motor adapter housing portion.

13. A handheld crimp on flange (COF) tool for crimping a weather strip onto a flange of a vehicle opening, the handheld COF tool comprising:
a housing configured as a handle for use in holding the handheld COF tool, wherein said housing attaches at a first end thereof to a pressurized air source;
a fixed crimp roller projecting from a second end of said housing, and rotatably mounted to said housing to rotate about a fixed axis in a first direction;
a movable crimp roller projecting from said second end of said housing proximate to said fixed crimp roller and rotatably mounted to said housing to rotate about a movable axis in a second direction opposite said first direction, wherein said movable crimp roller is axially offset from and movable toward and away from said fixed crimp roller;
a pneumatic motor encased within said housing and drivingly connected to said movable crimp roller and said fixed crimp roller, wherein said pneumatic motor is configured to convert pressurized air received from said pressurized air source into a rotational force to thereby rotate said movable crimp roller and said fixed crimp roller at a crimp speed;
wherein said pneumatic motor includes a control member configured to restrict said pneumatic motor and thereby selectively adjust said crimp speed of said movable crimp roller and said fixed crimp roller;
wherein said housing defines an array of exhaust ports configured when in an open condition to exhaust pressurized air from said pneumatic motor;
wherein said control member includes a collar rotatably attached to said housing and configured to incrementally block respective ones of said array of exhaust ports when rotated in a first direction to thereby decrease said crimp speed, and incrementally open respective ones of said array of exhaust ports when rotated in a second direction to thereby increase said crimp speed;
a pneumatic piston assembly encased within said housing and operatively engaged with said movable crimp roller, wherein said pneumatic piston assembly is configured to convert pressurized air received from said pressurized air source into a linear force to thereby move said movable crimp roller toward said fixed crimp roller at a crimp rate and thereby generate a crimp pressure between said movable crimp roller and said fixed crimp roller; and
a hand lever disposed on said housing and operative to fluidly connect said pneumatic motor, said pressurized air source, and said pneumatic piston assembly;
wherein said pneumatic motor is configured to selectively adjust said crimp speed, and said pneumatic piston assembly is configured to selectively adjust said crimp rate and said crimp pressure independent of said crimp speed and each other.

14. The handheld COF tool of claim 13, further comprising:
a transmission drivingly connecting said pneumatic motor with said fixed crimp roller and said movable crimp roller to transmit rotational power between said pneumatic motor and at least one of said movable crimp roller and said fixed crimp roller, said transmission including a first crimping shaft coaxial with and positively connected to said fixed crimp roller, a second crimping shaft coaxial with and positively connected to said movable crimp roller, and a belt drive system drivingly connecting said second crimping shaft to said pneumatic motor via a gear train.

15. The handheld COF tool of claim 13, wherein said pneumatic piston assembly includes a piston operatively engaged with said movable crimp roller and movably disposed within a pressurizable chamber defined by said housing, and a flexible diaphragm attached to said piston and said housing and configured to prevent said piston from contacting an inner peripheral surface of said pressurizable chamber, wherein pressurizing said pressurizable chamber moves said piston between an undeployed position and a deployed position to thereby move said movable crimp roller.

16. The handheld COF tool of claim 15, wherein said pneumatic piston assembly further includes at least one bleed port configured to selectively exhaust pressurized air from said pressurizable chamber and thereby selectively adjust said crimp pressure, and a flow control valve configured to restrict the volume of pressurized air flow to said pressurizable chamber and thereby selectively adjust said crimp rate.

17. A handheld crimp on flange (COF) tool for crimping a weather strip onto a flange of a vehicle opening, the handheld COF tool comprising:
a housing configured as a handle for use in holding the handheld COF tool, wherein said housing attaches at a first end thereof to a pressurized air source;
wherein said housing includes a gear housing portion positioned between a main housing portion and a motor adapter housing portion, wherein a seal member and at least one sealed bearing each fluidly separate said gear housing portion from said main housing portion and said motor adapter housing portion;
a fixed crimp roller projecting from a second end of said housing, and rotatably mounted to said housing to rotate about a fixed axis in a first direction;
a movable crimp roller projecting from said second end of said housing proximate to said fixed crimp roller and rotatably mounted to said housing to rotate about a movable axis in a second direction opposite said first direction, wherein said movable crimp roller is axially offset from and movable toward and away from said fixed crimp roller;
a pneumatic motor encased within said housing and drivingly connected to said movable crimp roller and said fixed crimp roller, wherein said pneumatic motor is configured to convert pressurized air received from said pressurized air source into a rotational force to thereby rotate said movable crimp roller and said fixed crimp roller at a crimp speed;
wherein said housing defines an array of exhaust ports configured when in an open condition to exhaust pressurized air from said pneumatic motor;
wherein said pneumatic motor includes a collar rotatably attached to said housing and configured to incrementally block respective ones of said array of exhaust ports when rotated in a first direction to thereby decrease said crimp speed of said movable crimp roller and said fixed crimp roller, and incrementally open respective ones of said array of exhaust ports when rotated in a second direction to thereby increase said crimp speed of said movable crimp roller and said fixed crimp roller so as to restrict said pneumatic motor and thereby selectively adjust said crimp speed of said movable crimp roller and said fixed crimp roller;
a transmission including a belt drive system and configured to drivingly connect said pneumatic motor with said movable crimp roller and said fixed crimp roller to transmit rotational power between said pneumatic motor and at least one of said movable crimp roller and said fixed crimp roller, wherein said transmission includes a first crimping shaft coaxial with and positively connected to said fixed crimp roller, and a second crimping shaft coaxial with and positively connected to said movable crimp roller;
wherein said fixed crimp roller is releasably attached to said first crimping shaft and said movable crimp roller is releasably attached to said second crimping shaft such that each of said fixed crimp roller and said movable crimp roller can be removed from the handheld COF tool without removing a respective one of said first crimping shaft and said second crimping shaft from the handheld COF tool;
a pneumatic piston assembly encased within said housing and operatively engaged with said movable crimp roller, wherein said pneumatic piston assembly is configured to convert pressurized air received from said pressurized air source into a linear force to thereby move said movable crimp roller toward said fixed crimp roller at a crimp rate and thereby generate a crimp pressure between said movable crimp roller and said fixed crimp roller;
wherein said pneumatic piston assembly includes a flow control valve configured to restrict a volume of pressurized air flow to the pneumatic piston assembly to thereby selectively adjust said crimp rate at which said movable crimp roller moves relative to said fixed crimp roller;
wherein said pneumatic piston assembly includes at least one bleed port configured to selectively exhaust pressurized air from the handheld COF tool to thereby selectively adjust said crimp pressure; and
a hand lever disposed on said housing and operative to depress towards said housing to thereby fluidly connect said pneumatic motor, said pressurized air source, and said pneumatic piston assembly;
wherein said pneumatic motor is configured to selectively adjust said crimp speed, and said pneumatic piston assembly is configured to selectively adjust said crimp rate and said crimp pressure independent of said crimp speed and each other.

* * * * *